United States Patent [19]

Hultman et al.

[11] 4,026,587

[45] May 31, 1977

[54] UNDERWATER TURBINE OPERATED BY OCEAN CURRENTS

[76] Inventors: Robert H. Hultman, 42748 Newport Drive, Fremont, Calif. 94538; Dennis C. Hultman, 11035 Early Dawn Road, Turlock, Calif. 95380

[22] Filed: Apr. 24, 1975

[21] Appl. No.: 571,367

[52] U.S. Cl. .................................. 290/53; 60/502; 290/42
[51] Int. Cl.² .......................................... F03B 13/10
[58] Field of Search ............................ 290/42–44, 290/53–55; 60/398, 497–502

[56] References Cited

UNITED STATES PATENTS

| | | | |
|---|---|---|---|
| 1,633,460 | 6/1927 | Silvestrin | 290/44 |
| 2,820,148 | 1/1958 | Southwick | 290/42 |
| 3,426,540 | 2/1969 | Fixel | 290/42 |
| 3,928,771 | 12/1975 | Straumsnes | 290/53 |

FOREIGN PATENTS OR APPLICATIONS

| | | | |
|---|---|---|---|
| 18,641 | 12/1891 | United Kingdom | 290/44 |

*Primary Examiner*—Robert S. Macon
*Attorney, Agent, or Firm*—William R. Piper

[57] ABSTRACT

An underwater turbine operated by prevailing ocean currents in which the generator casing has a large enough interior to house the generator and still provide space for an operator to enter the casing interior to inspect the generator and the electrical connections. The casing is swingably mounted on a base that rests on the ocean floor and a propeller for rotating the generator at a proper and constant speed is rotatably mounted at the forward end of the casing while a tail or fins extend from the rear of the casing for the purpose of keeping the propeller facing in the direction of the incoming water current regardless of the slight variations in the current flow. The casing is hermetically sealed and has an entrance hatch which, when opened, permits the operator to enter the casing interior. A diving bell is used to lower the operator to the casing and novel means permits the operator in the bell to secure it to the casing at a point adjacent to the hatch, thus permitting the operator to move from the bell interior into the casing interior and vice versa.

4 Claims, 4 Drawing Figures

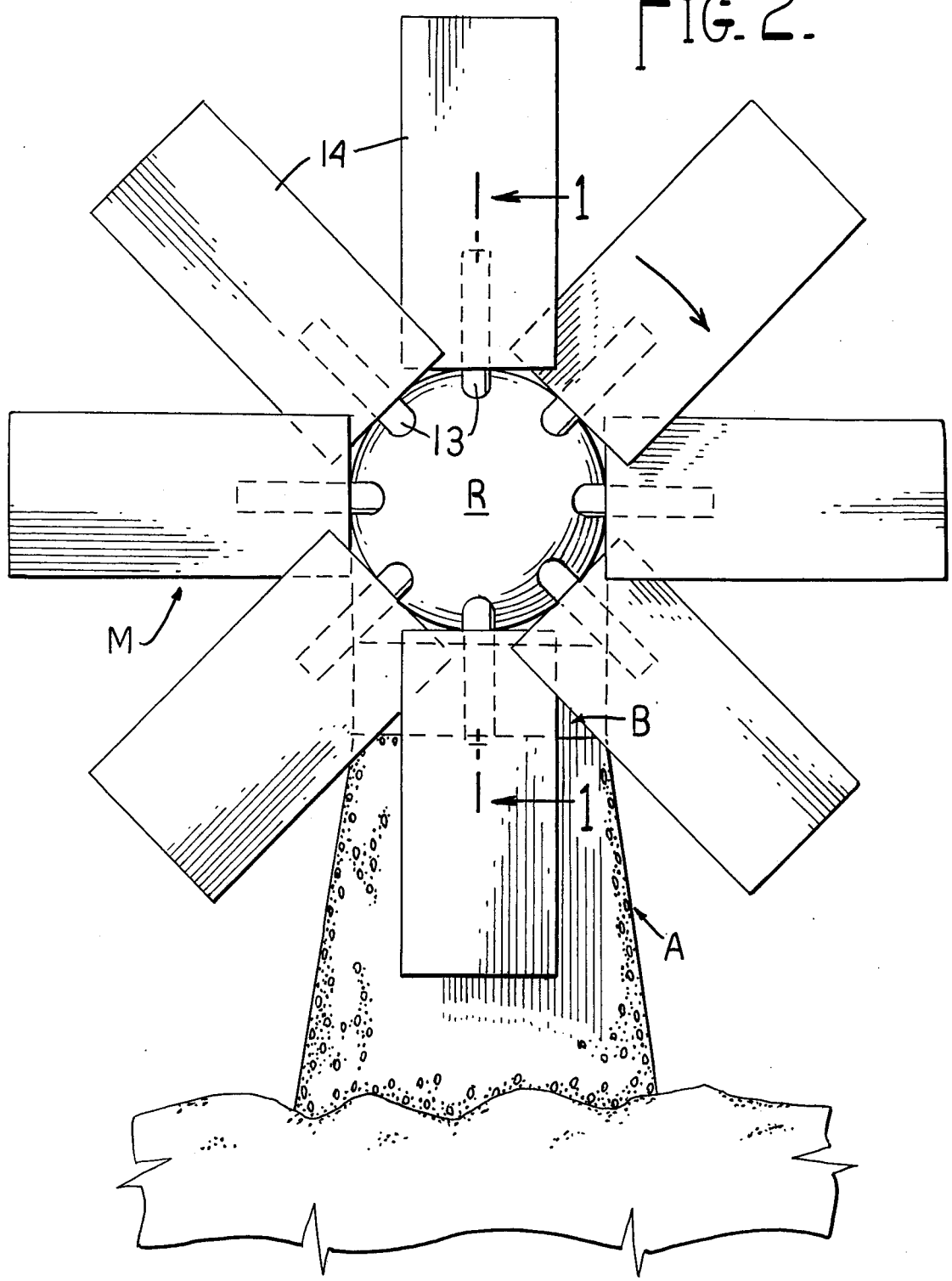

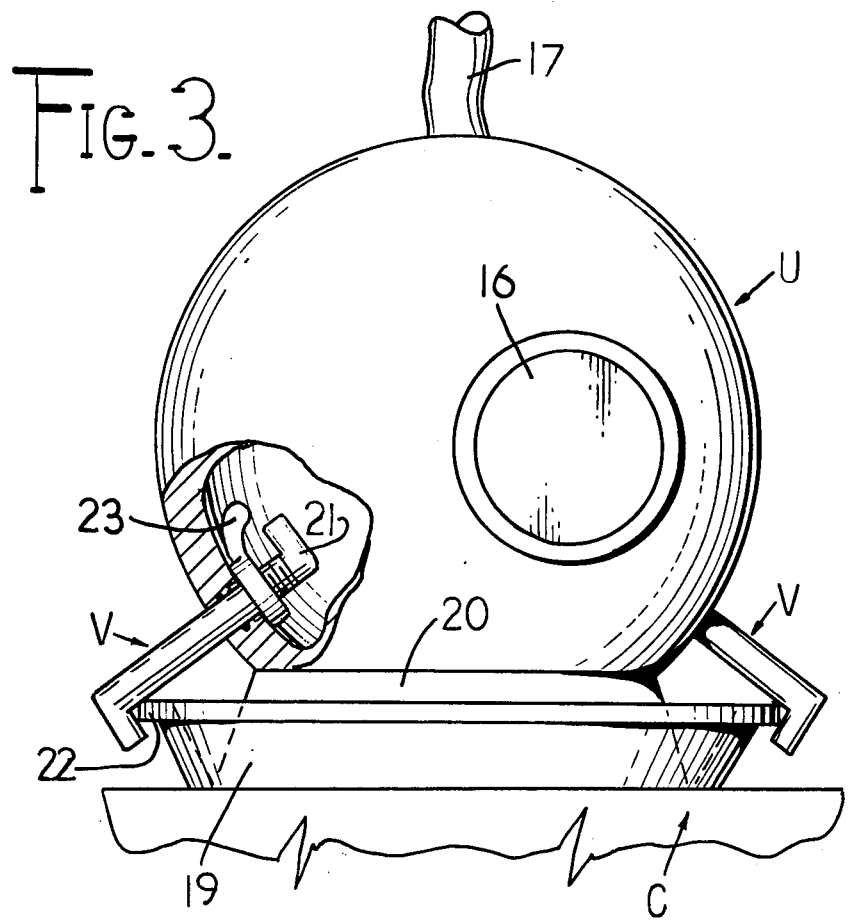
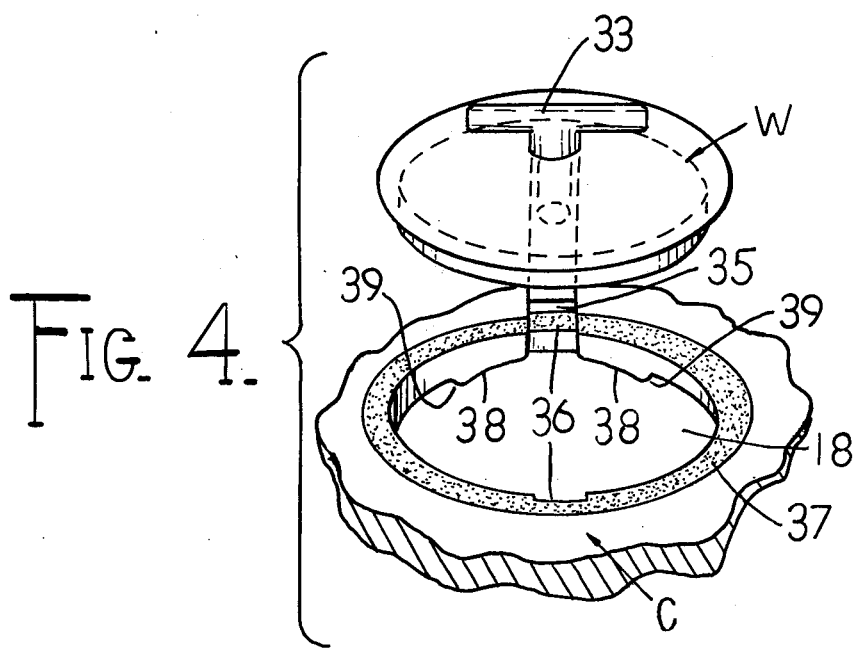

UNDERWATER TURBINE OPERATED BY OCEAN CURRENTS

There is tremendous power in deep ocean currents and they have a steady flow with very little change in the direction of this flow. We intend to harness this flow to produce an electric current. We mount a large concrete base on the ocean floor in a position where a deep ocean current will flow continually past this base. We swingably mount a large casing on the base and a large electric generator is housed within the casing. The casing can swing about a vertical axis through 360°. The propeller shaft is connected to the generator shaft through appropriate gearing so that the slower rotation of the propeller shaft will cause the generator shaft to rotate at the necessary speed to generate the electric current.

In the present invention the generator delivers an electric current that is conveyed by wires up to the surface of the ocean and to a power house where the current can be used for any purpose desired. Furthermore, the casing in which our generator is housed in free to swing about a base that in turn rests on the ocean floor. Tail fins keep the front end of the casing facing the current flow and a propeller also rotatably mounted at the front of the casing will face the water current and be continuously rotated for rotating the generator to create an electric current.

SUMMARY OF THE INVENTION

An object of our invention is to place an electric generator in a casing and provide a base for the casing which will permit it to swing about a vertical axis through 360°. The base is placed on the ocean floor at a depth and in a position to have an ocean current continually flow past the base and the swingable casing. At the front of the casing we mount a propeller and tail fins project from the casing rear. The tail fins will cause the propeller to face the water current regardless of any current irregularities of flow so that the propeller will continually operate and in turn operate the generator at a constant speed to generate electricity. The propeller blades are automatically varied in pitch as the water flow varies in speed so that the generator will operate at a constant speed for generating electricity. Wires convey the electric current from the generator to a power house where the current can be used for any desired purpose.

BRIEF DESCRIPTION OF THE DRAWINGS

FIG. 2 is a front elevation of FIG. 1 and is shown on a smaller scale.

FIG. 3 is an enlarged elevational view of the diving bell and illustrates how it can be connected to the casing that houses the electric generator.

FIG. 4 is an isometric showing of the hatch cover and associate portion of the casing that houses the electric generator.

DESCRIPTION OF THE PREFERRED EMBODIMENT

Figure 1:
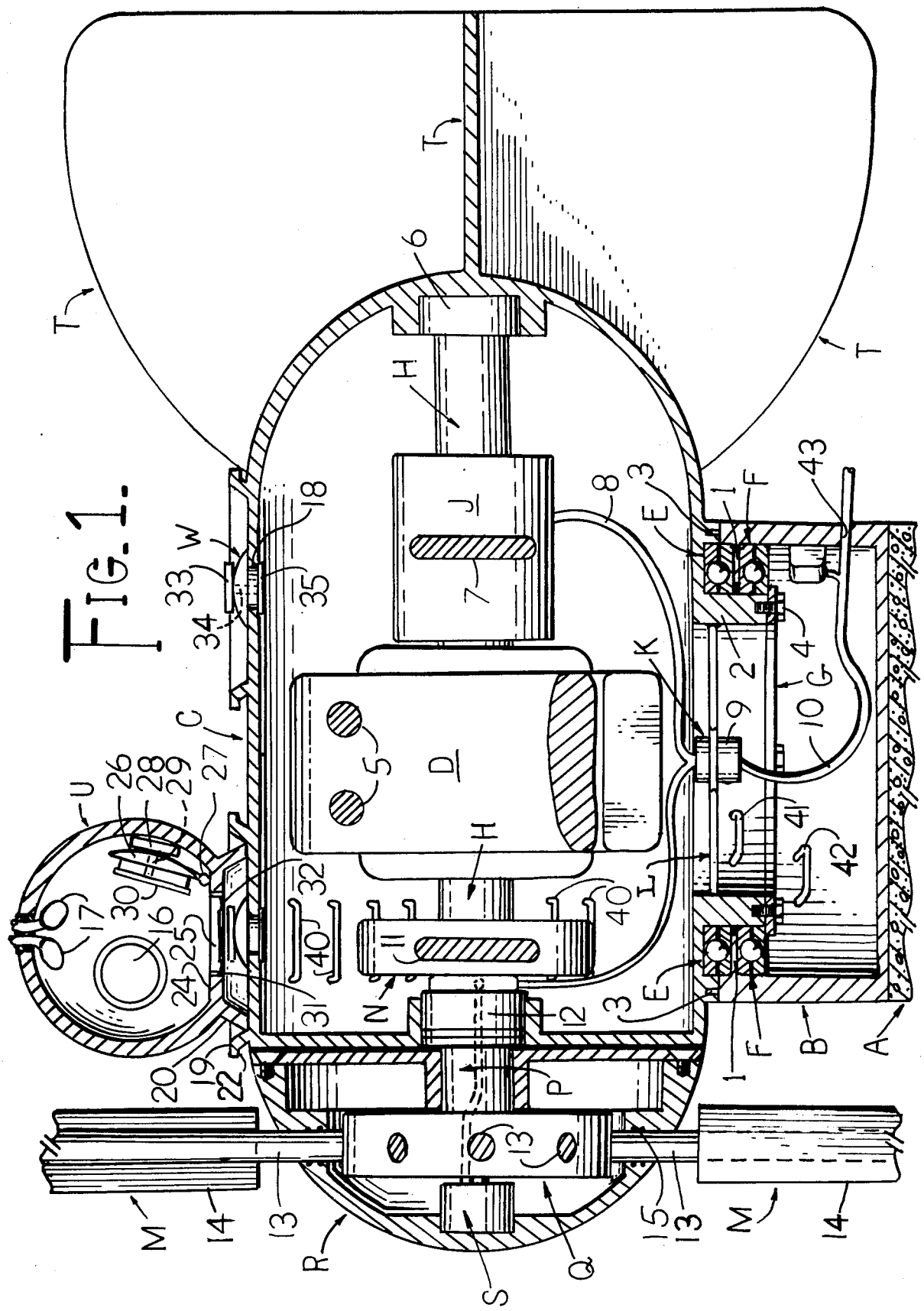
FIG. 1 is a longitudinal section through the device and shows a diving bell being coupled to the casing that houses the electric generator. It is taken along the section line 1—1 of FIG. 2.

In carrying out our invention we provide a concrete base A that rests on the floor of the ocean and is positioned in the path of a prevailing ocean current. The base is large and heavy enough to withstand the force of the ocean current flow. FIG. 2 shows a front elevation of the upper portion of the base while FIG. 1 shows the concrete base in cross section.

Referring to FIG. 1, it will be seen that the top of the base A supports a cylindrical member B that has an open top and an inwardly extending annular flange 1 that is spaced a slight distance from the rim of the open top. A housing C for an electric generator D has a depending cylindrical flange 2 that is rotatably received within the cylindrical supporting member B. A ball bearing race E rests on the annular flange 1 and rotatably supports the housing C. A seal 3 encircles the ball bearing race E and bears against the rim of the cylindrical support member A so as to prevent any salt water from entering the ball bearing race E.

A second ball bearing race F underlies the annular inwardly extending flange 1 of the cylindrical support member B and a retaining ring G for the second or lower ball bearing race F is secured to the lower edge of the depending cylindrical flange 2 by cap screws 4 or other suitable fastening means. It will be seen from the structure thus far described that the two ball bearing races E and F permit the housing C to rotate 360° about the cylindrical supporting member B and that these bearings also act as thrust bearings to prevent any vertical movement of the housing C with respect to its support B. Other means for rotatably supporting said housing C could be used.

The housing C has the electric generator D mounted therein and mounts 5 connect the generator casing to the housing interior so as to provide sufficient space to permit an operator to walk around the generator for inspection, see FIG. 1. The generator shaft H extends through a commutator J and one end of the shaft is supported by a bearing 6. Another mount 7 extends from the casing for the commutator J to the interior of the housing C so as to support the commutator.

Electric wires, indicated generally at 8 in FIG. 1, extend from the commutator J to an electric outlet box K. The box K is centered with respect to the vertical axis around which the housing C is free to rotate and a spider L supports the electric outlet box and the outer ends of the spider are secured to the cylindrical depending flange 2 of the housing. A connector box 9 is connected to the electrical outlet box K in such a manner as to remain stationary while the box K can rotate or swing in unison with any rotative movement of the housing C in a manner hereinafter described. The electrical outlet box K could have an electric brush, not shown, connected to each wire 8 from the commutator J, and these brushes would form an electrical contact with concentric conductor rings, not shown, and mounted in the connector box 9 so that electric current would be carried from the wires 8 to wires 10 because the wires 10 were electrically connected to the concentric conductor rings, not shown. Any type of electrical connection between the outlet box K and the connector box 9 can be used so that the box K can rotate about the vertical axis in unison with the swinging of the housing C while the connector box 9 remains stationary.

The generator shaft H must be rotated at a constant speed to generate electricity regardless of any change in speed of the ocean current that continuously flows past the housing C. Also, the ocean current flow would rotate a propeller M at a slower speed than the required for rotating the generator shaft H. Therefore, we show in FIG. 1 how the forward end of the generator shaft H enters a transmission casing N and how a propeller shaft P also enters the transmission casing and through appropriate gearing, not shown, will rotate the generator shaft at a higher desired speed. FIG. 1 shows a mount 11 extending from the transmission casing N and this mount is connected to the housing C. The propeller shaft P extends through a bearing 12 that is centrally supported at the front end of the housing C.

The propeller M is of the variable pitch type and we show a central casing Q housed within a dome-shaped member R, see FIG. 1. The member R rotates with the propeller shaft P as a unit and the spokes 13 for the propeller blades 14 extend radially from the central casing Q and project through radially extending bores 15 in the dome-shaped member R. An automatic feathering unit S is controlled by the speed of the generator shaft H so as to automatically change the angle of the blades 14 in such a way that the generator shaft will be rotated at a constant speed by the propeller regardless of any change in the speed of the flow of water in the ocean current.

The direction of flow of the ocean current may vary slightly and we provide rearwardly extending vanes or fins T that project from the rear of the housing C, as is shown in FIG. 1. These fins will cause the housing to swing about its vertical axis so as to cause the propeller M to continuously face in the direction of the ocean current flow.

It is necessary for an operator to inspect the electric generator from time to time. We provide a diving bell U that will house one or two operators, see FIGS. 1 and 3. This diving bell is preferably spherical in shape and it has a window 16 therein so that the operator can guide the bell in its downward descent toward the housing C. A cable 17 is anchored to the bell and can raise or lower the bell in the ocean water. The cable also carries air lines, power and communication lines for the bell U.

We provide novel means for coupling the diving bell U to the housing C so that the operator can move from the bell into the interior of the housing for inspecting the generator and other parts of the device. The housing has an opening 18 in its top that is large enough for a person to pass therethrough. A collar 19, integral with the housing C surrounds the opening 18 and the collar has a conical inner wall. The diving bell has an outwardly flared skirt 20 on its under side and the outer diameter at the rim of the skirt is the same as the inner diameter of the conical wall of the collar 19 where it joins the cylindrical wall of the housing C. It will be seen from this structure that the diving bell U can be lowered by the cable 17 until the skirt 20 strikes the inner conical wall of the collar 19. Then this conical wall will center the skirt 20 with the man-hole opening 18 in the housing C before the downward descent of the bell U will be stopped.

We provide a simple locking mechanism for securing the diving bell to the collar 19 of the housing C. FIG. 3 shows a pair of catches V that project through the wall of the diving bell U. Each catch V has a handle 21 on its inner end by means of which the catch can be rotated for causing its outer end to engage with the flange 22 for the collar 19. The shank portion of the catch V is threated and a clamping nut 23 with an integral handle can be rotated on the threated portion of the catch for bearing against the inner surface of the bell and tightening the catch V on to the flange 22. In this way a water tight seal is made between the diving bell U and the housing C.

In FIG. 1, we show a section through the diving bell U. A partition 24 extends across the bell interior at the juncture where the integral skirt 20 joins the spherical portion of the bell. The partition 24 has a central opening 25 therein and a cover 26 for closing the opening is hinged to the partition at 27. The cover 26 has a cover locking handle 28 and the handle can be rotated for rotating a shank 29 that carries a locking lug 30 at its other end. The rim of the opening 25 in the partition 24 has diametrically opposed recesses 31 for receiving the ends of the locking lug 30 when the latter is swung into alignment with the recesses by means of the handle 28. Also, the central opening 25 in the partition 24 has an annular recess 32 in its rim and when the cover 26 closed the operator can rotate the handle 28 for rotating the locking lug 30 for moving the lug ends out of registration with the opposed recesses 31 and into registration with the annular recess 32 for locking the cover in closed and water-tight position. The opposite movement of the handle 28 is accomplished when the operator desires to open the cover 26.

The cover 26 is shown in open position in FIG. 1 after the diving bell U has been secured to the housing C. The man-hole 18 in the housing C is normally closed by a hatch W. The exploded view of FIG. 4 shows an enlarged view of the hatch W removed from the man hole 18 in the cylindrical housing C. A handle 33 is rotatably mounted in the center of the hatch and the shank 34 of the handle is connected to a locking lug 35. The man hole 18 in the housing C has diametrically opposed recesses 36 to receive the ends of the locking lug 35 when the hatch W is moved into closed position in the man hole or opening 18. A gasket 37 is placed between the wall of the housing C and the hatch W to make a water tight seal when the hatch is closed. The inner surface of the wall of the housing C that lies adjacent to the man hole opening 18 is provided with cam portions 38 followed by notches 39, see FIG. 4. After the operator has aligned the ends of the locking lug 35 and has closed the hatch W over the opeing 18, he rotates the handle 33 for sliding the ends along the cam portions 38 until they register with and are received by the notches 39. The hatch is now secured in closed position. The gasket 37 will yield and permit this movement. The opposite procedure is followed when opening the hatch to gain access to the interior of the housing C. We have shown one type of locking mechanism for the cover 26 and the hatch W. Other locking mechanisms could be used.

It will be seen from FIG. 1 that the interior wall of the housing C is provided with spaced apart ladder rungs 40 by means of which the operator can enter the interior of the housing C after the diving bell U has been secured to the housing and both the cover 26 in the bell and the hatch W in the housing have been opened. The interior of the housing is large enough for the operator to move around for inspecting the generator and any other working parts within the housing. An additional ladder rung 41 is provided on the inner surface of the cylindrical depending flange 2 and another rung 42 is secured to the inner wall of the cylindrical member B. This makes it possible for the operator to move from the interior of the housing C into the interior of the cylindrical member B for inspecting the electrical outlet box K and the connector box 9.

OPERATION

From the foregoing description of the various parts of the device, the operation thereof may be readily understood. The wires 10 lead from the connector box 9 through an opening 43 in the wall of the cylindrical member B. The opening 43 is sealed to prevent any water leakage and the wires 10 are sheathed in a cable that extends to the surface of the ocean where the wires can be led into a power house, not shown, and the electricity can be used for any desired purpose.

The housing C is free to swing about its vertical axis and the fins T will always cause the propeller to face in the direction of the flowing ocean current. The automatic feathering of the vanes 14 will cause the propeller to rotate at a uniform speed regardless of the speed of the flowing ocean current and this will cause the generator to operate at a uniform speed to generate the electricity.

Inspection of the generator and other moving parts, as well as the electrical connections, can be accomplished from time to time by an operator in the manner already described. The automatic feathering unit S will automatically feather the propeller blades 14 in case of an emergency, such as a shaft bearing failure, an electrical failure, etc., or to prevent a burn out or other such problems.

We claim:
1. In combination:
   a. a base adapted to be submerged in an ocean current and rest on the ocean floor;
   b. an elongated housing swingably mounted on said base and being free to swing through a circle of 360° about a vertical axis;
   c. an electric generator mounted in said housing, the interior of the housing being large enough for a person to enter for inspecting said generator, said housing having an opening large enough for a person to enter, and a removable cover for the opening;
   d. a propeller rotatably mounted at the front end of said housing and fins mounted at the other end, whereby the prevailing ocean current will strike said fins for swinging said housing so that said propeller will continually face the ocean current;
   e. means operatively connecting said propeller to said generator; and
   f. an electric cable electrically connected to said generator and extending to the ocean surface for conveying the electric current from the generator.

2. The combination as set forth in claim 1: and in which
   a. the means that operatively connects said propeller to said generator includes a transmission for causing the propeller to rotate the generator at a correct speed for generating electricity;
   b. said propeller having variable pitch blades; and
   c. an automatic feathering unit for the propeller blades which will cause said propeller to rotate at a constant speed regardless of the variations in the ocean current flow in order for the propeller to maintain the generator operating at a constant speed.

3. The combination as set forth in claim 1: and in which
   a. a dividing bell large enough to contain a person and having a cable by means of which said bell can be lowered to said elongated housing in the ocean;
   b. said diving bell and said housing having cooperating means for securing said bell to said housing adjacent to the opening in said housing for making a leakproof connection; and
   c. said bell having an opening through which a person can pass; and
   d. a cover for the opening in the bell operable when said bell is connected to said housing to make a leak proof connection therebetween whereupon the person in the bell can open the housing cover to gain entrance to the housing interior for inspecting said generator and other parts.

4. The combination as set forth in claim 3: and in which
   a. the cooperating means for removably securing said dividing bell to said housing includes an outwardly flared flange integral with said housing and encircling the opening in said housing;
   b. said bell having an outwardly flared skirt integral with said bell and encircling the opening in said bell, said skirt being of a lesser diameter than the diameter of said flange so that said flange will guide the bell toward the opening in said housing as the bell is lowered; and
   c. said bell securing means to said housing including catches carried by said bell and engageable with said flange for removably connecting said bell to said housing.

* * * * *